United States Patent [19]

Brandt et al.

[11] Patent Number: 4,749,335

[45] Date of Patent: Jun. 7, 1988

[54] ROTARY JOINT

[75] Inventors: Bengt A. Brandt, Sundbyberg; Bertil Englesson, Bromma, both of Sweden

[73] Assignee: Flygt AB, Solna, Sweden

[21] Appl. No.: 109,781

[22] Filed: Oct. 16, 1987

[30] Foreign Application Priority Data

Nov. 25, 1986 [SE] Sweden .............................. 8605041

[51] Int. Cl.⁴ ...................... B63H 3/08; F01D 17/26
[52] U.S. Cl. .................. 416/157 R; 416/167; 416/156; 137/580
[58] Field of Search .............. 416/162, 157 R, 157 A, 416/157 B, 157 C, 153, 154, 49, 167, 156; 137/580; 415/33, 129–130

[56] References Cited

U.S. PATENT DOCUMENTS

| | | | |
|---|---|---|---|
| 2,536,565 | 1/1951 | Ostergren | 416/157 R X |
| 2,781,857 | 2/1957 | Harvey | 416/157 R |
| 3,664,762 | 5/1972 | Lachni | 416/156 |
| 3,690,788 | 9/1972 | Pedersen | 416/157 R |
| 3,785,747 | 1/1974 | Mayo | 415/33 |
| 3,923,133 | 12/1975 | Chivari | 137/580 X |
| 4,218,185 | 8/1980 | Trytek | 416/157 R X |
| 4,563,940 | 1/1986 | Wührer | 416/157 R X |

FOREIGN PATENT DOCUMENTS

| | | | |
|---|---|---|---|
| 174286 | 3/1986 | European Pat. Off. | 416/167 |
| 2344190 | 3/1974 | Fed. Rep. of Germany | 137/580 |
| 3239916 | 5/1984 | Fed. Rep. of Germany | 416/162 |
| 1180324 | 6/1955 | France | 416/157 A |
| 1283196 | 12/1961 | France | 416/157 R |
| 35294 | 3/1983 | Japan | 416/157 R |

*Primary Examiner*—Everette A. Powell, Jr.
*Attorney, Agent, or Firm*—Menotti J. Lombardi

[57] ABSTRACT

A rotary joint having a non rotary housing surrounding a rotating shaft and being sealed by a mechanical seal. Monitoring impulses are transmitted by hydraulic fluid which is transported between the housing and the shaft by means of a distribution socket. The socket is arranged so that a number of column seals are formed between the shaft and the socket. The apparatus is supported by two prestressed, reversed roller bearings.

7 Claims, 2 Drawing Sheets 4,749,335

ROTARY JOINT

BACKGROUND OF THE INVENTION

The invention concerns a rotary joint to be used for controlling the vane angles of a water turbine or a propeller pump.

A water turbine has a rotating hub provided with a number of vanes and arranged in a tube or the like with flowing water. The rotary energy obtained is transmitted to a generator for electric current. The rotary energy obtained is, of course, totally dependent on the amount of flowing water and the potential energy head that can be utilized. The amount of water may vary considerably which means that the turbine will operate with different flows at different times. As the turbine is designed to have its maximum efficiency at a certain volume of flow and a certain head, the energy of the water will be more or less well utilized.

By designing the vanes adjustable, which means that the vane angle with relation to the water flow may be varied, there is a possibility to optimize the efficiency within a relatively wide range of water flow. In older turbine equipment, where the turbine through an elongated shaft is connected to a "dry" generator, the adjustment of the vanes has been relatively easy to obtain by help of hydraulic or other mechanical transmission means along the shaft. However, recently an entirely new type of turbine/generator has been utilized. The turbine and the generator are integrated into one unit so that it may be easily hoisted up from the water tube for service. This type of energy generator is especially suitable for small volumes and relatively low heads.

Such a turbine when provided with adjustable vanes, must be easily serviceable. Also, the monitoring impulses that cause adjustments of the vane angles, must be transmitted from a non-rotating to a rotating element in its operating environment.

SUMMARY OF THE INVENTION

It is an object of the invention to provide a rotary joint to be used for controlling the vane angles of a water turbine or propeller pump.

Another object of the invention is to provide a rotary joint which permits monitoring impulses which are transmitted by hydraulic fluid to be transported from a non-rotating to a rotating element.

According to the broader aspects of the invention, the rotary joint has a non-rotary housing surrounding a rotating shaft and is sealed by a mechanical seal. Hydraulic fluid is transported between the non-rotating housing and the rotating shaft by means of a distribution socket arranged with a number of column seals formed between the shaft and socket.

While the following description relates to a water turbine for connection to an electric generator producing electrical energy, the arrangement is suitable for use with a pump connected to an electric motor or other energy source.

BRIEF DESCRIPTION OF THE DRAWINGS

The foregoing objects and others of the invention will become more apparent by reference to the following description in conjunction with the drawings, in which.

DETAILED DESCRIPTION OF THE PREFERRED EMBODIMENT

Figure 1:
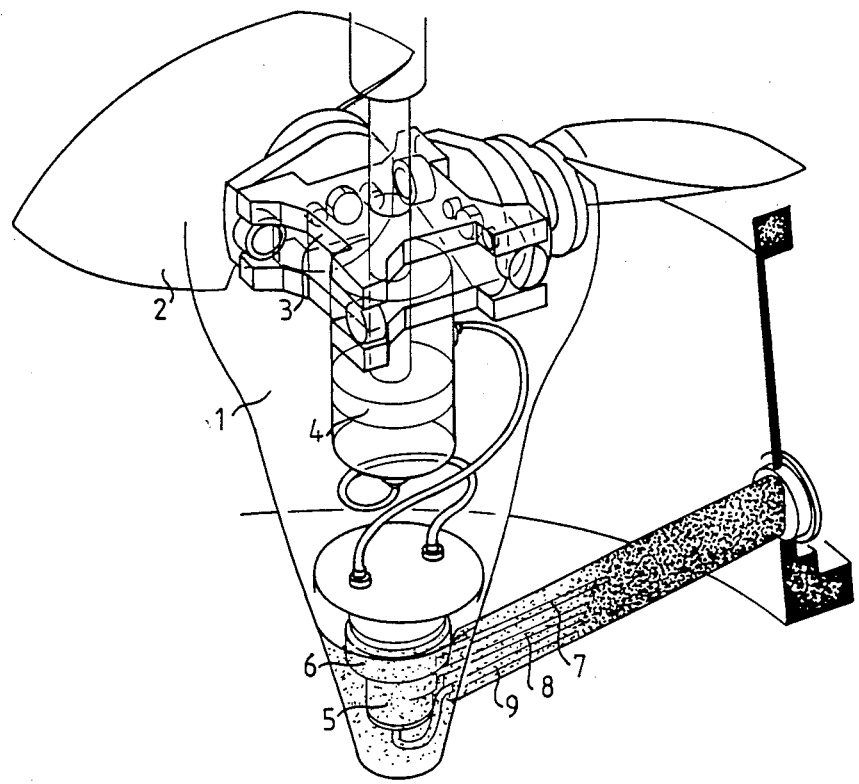
FIG. 1 illustrates a partial view of a part of the hydraulic unit in a submersible energy unit which includes a generator.

Referring now to FIG. 1, there is shown a hub 1 and vanes 2 turnably attached to the hub, with a mechanical transmission means 3, and a hydraulic cylinder 4. A rotary unit comprising a non-rotating part 5 and a rotating part 6, is coupled to pressure medium tubes 7,8 and tube 9.

Figure 2:
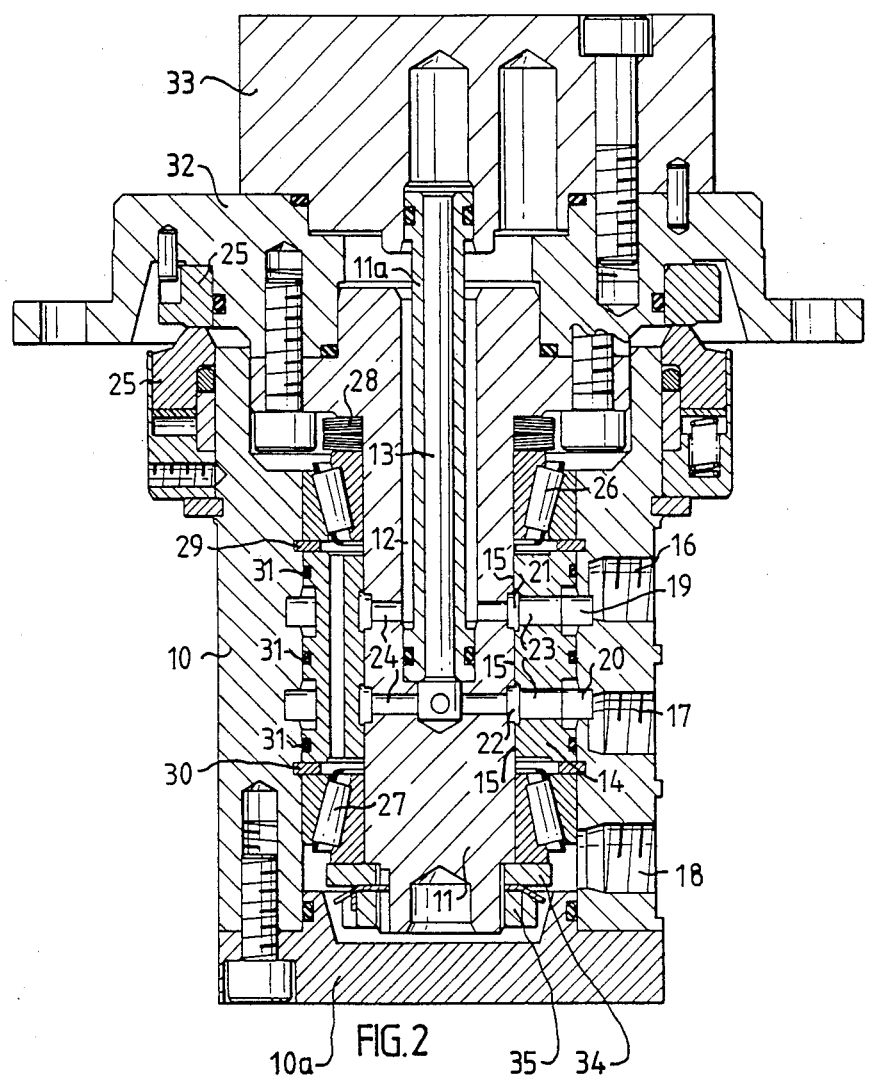
FIG. 2 shows a detailed view of a rotary joint in accordance with the invention.

Additionally referring to FIG. 2, there is illustrated a housing 10, housing end plate 10a, a shaft 11 with tubular member 11a forming axial channels 12 and 13. A distribution socket 14 has column seals 15. Housing 10 has inlet/outlet ports 16, 17 and a drainage port 18. There is provided outer ring channels 19, 20, inner ring channels 21, 22, and a number of radially directed borings 23 in socket 14. A mechancial seal 25 is provided between housing 10 and rotating part 32. Part 33 is attached to part 32. The arrangement includes roller bearings 26, 27, spring assembly 28, retaining rings 29, 30 and O-rings 31.

As mentioned above, the electric and the hydraulic parts are integrated into one unit which may be easily mounted in a preferably vertical tube for the flowing water. This means that great advantages are obtained during building of the power plant as well as at service of the equipment. In order to fully utilize these advantages it is, of course, important that the means for obtaining adjustments of the vanes are a part of the integrated unit. The device according to the invention makes this possible in a simple and reliable manner.

A pressure medium is brought from a pressure source by means of the tubes 7 and 8 (FIG. 1) to the non-rotating part 5 of the rotary joint. Part 5 is connected to the rotary part 6, the transition being sealed by the mechanical seal 25. The complete rotary joint is submersed like the entire assembly.

The pressure medium, for example, hydraulic oil, is coupled to the port 16 and by means of the distribution socket 14 and the channel 12 in the shaft 11 transmitted to a hydraulic cylinder which in turn mechanically acts upon the vanes. The pressure medium from the hydraulic cylinder is returned by means of channel 13 and the socket 14 to the port 17. When adjusting the vanes in the opposite direction, the medium is fed in a similar way to the port 17 and is taken away through the port 16.

The distribution socket 14 establishes the transition between the non-rotating housing 10 and the rotating shaft 11. The socket 14 is fixed to the housing 10 by retaining rings 29, 30, and has a number of column seals 15 with the shaft 11. The socket 14 is provided with radial bores 23 on its mantle surface arranged in front of the ports 16 and 17 in the housing 10. Ring channels 19, 20 in the socket and the housing create connections between the bores on the outside of the socket, while other ring channels 21, 22 create corresponding connections on the inside of the socket and outside of the shaft. The shaft 11 has corresponding bores 24 which connect the channels 12 and 13 with the ring channels 21 and 22 respectively.

For the column seals to work satisfactorily it is, of course, very important the the outer part of the housing 10 is rigidly supported in the rotating part and that surrounding medium is not allowed to penetrate into the seal area. The sealing is obtained by a mechanical seal 25, which stands very high pressures. The support of the socket is by means of the roller bearings so arranged that the load is directly inclined towards the shaft, thus obtaining a centering force.

Since the column seals 15 always leak to a certain extent, the drainage is collected in the lower part of the assembly and is drained from port 18, backwards to the pressure source. As the latter normally is arranged for above the joint, this drainage brings about a high static pressure which is transmitted to the inner ring of the lower bearing. In order to stand this force, said inner ring is supported by a shoulder ring 34 which is maintained by locking ring 35 on the shaft 11.

In the upper bearing 26 which is reversed mounted with regard to the lower bearing 27, the inner ring is not exposed to the same static load. To secure that the inner ring moves together with the outer ring in the movement caused by the static load, one or several disc springs 28 are arranged between a shoulder on the shaft and the inner ring of bearing 26. In this way, both bearings are correctly loaded. The spring force may be chosen according to the load.

In order to secure that the socket 14 will not be exposed to axial forces which may damage the column seals 15, retaining rings 29, 30 or the like are arranged between the outer rings of the bearings 26, 27 and the end faces of the socket 14. The retaining rings 29, 30 are rigidly attached to the housing 10, thus preventing the outer rings of the bearings 26, 27 from moving towards each other and exertin axial forces on the socket 14. The socket 14 is sealed in the housing 10 by O-rings 31 which allow a small movement between the socket 14 and the housing 10.

According to the invention, a rotary joint is obtained which, in a secure way, transmits monitoring impulses from a non-rotating to a rotating part in an under water environment under heavy pressure loads. In the description, a turbine unit having a vertical shaft has been referred to. The invention may, however, be used in machines having inclined or horizontal shafts. In these, the direction upwards will be defined as the direction towards the turbine or pump.

While we have described above the principles of our invention in connection with specific apparatus, it is to be clearly understood that this description is made only by way of example and not as a limitation to the scope of our invention as set forth in the objects thereof and in the accompanying claims.

We claim:

1. Rotary joint apparatus for transmitting a hydraulic fluid between a non-rotating part and a rotating part comprising:
   a non-rotating outer housing having a plurality of radially extending ports;
   a non-rotating distribution socket having a plurality of radial borings, said socket being retained within said housing and having a number of radial bores connected by a plurality of outer and inner ring channels, said outer channels being positioned for transmitting said fluid from said radially extending ports;
   an inner rotatable shaft bearing mounted within said outer housing and having a number of radial bores connected to said inner ring channels;
   said shaft having a plurality of axial channels cooperating with said radial shaft bores, such that said fluid is transmitted between said radial ports through said outer ring channel and said distribution borings through said inner ring channel to said shaft borings, and hence to said axial channels;
   a pair of roller bearings, one at each end of said socket and positioned between said housing and shaft with said bearings being arranged with the bearing load directly inclined toward said shaft;
   a spring arrangement positioned between a shoulder of said shaft and the inner ring of one of said bearings, so that the preload on the roller bearing is in direction of said socket, and an end ring positioned at the other end of said shaft and abutting the inner ring of said other bearing; and
   a pair of retaining rings positioned in said housing adjacent said socket, and said retaining rings abutting the outer rings of said bearings so that the axial load on said bearings is not transmitted to the said socket.

2. The apparatus of claim 1 wherein the interface between said socket and housing is sealed by a plurality of O-rings.

3. In a rotary joint apparatus for transmitting hydraulic fluid between a non-rotating outer housing (10) and an inner rotating shaft (11), the fluid is coupled through radial connections (16,17) in the housing (10) and radial connections (24) in the shaft (11) to axial channels (12,13), and a non-rotating distribution socket (14) is arranged between the housing (10) and the shaft (11), which socket (14) has a number of radial bores (23) connected by outer (20) and inner (21) ring channels respectively to said radial connection (16,17) in said housing (10) and said radial connections (24) in said shaft (11), the improvement comprising:
   a pair of roller bearings (26,27), one at each end of said socket (14) and mounted between said housing (10) and shaft (11), such that the bearing (26) is reversed relative to the bearing (27) and arranged so that the load is directed inclined to the shaft (11);
   a disc spring arrangement (26) mounted between an upper shoulder of shaft (11) and the inner ring of bearing (26) to preload the bearing (26) in the direction of socket (14) and the inner ring of the other bearing (27) abutting a shoulder means (34) on the other end of shaft (11); and
   retaining rings (23,29) mounted in housing (10) on either side of socket (14) and adjacent to outer rings of the bearings (27,28) so that the axial load on the bearings is not transmitted to the socket (14).

4. The apparatus of claim 3, wherein the socket (14) is sealed in the housing (10) by O-rings (31).

5. Rotary joint apparatus for transmitting a hydraulic fluid between a non-rotating and a rotating part, comprising in combination:
   a non-rotating cylindrical housing having a plurality of radially extending ports;
   an upper and lower retaining ring mounted within said housing;
   a non-rotating cylindrical distribution socket mounted within said upper and lower retaining ring, said socket having a plurality of upper radial bores connected by an upper outer ring channel and an upper inner ring channel, and said socket having a plurality of lower radial bores connected by a lower outer ring channel and a lower inner ring channel;

an upper roller bearing mounted in said housing and against said upper retaining ring, and a lower roller bearing mounted in said housing in reverse to said upper bearing and against said lower retaining ring;

a rotatable shaft mounted in said upper and lower bearings and within said socket, said shaft having a plurality of upper bores in cooperative alignment with said upper inner ring channel, and said shaft having a plurality of lower bores in cooperative alignment with said lower inner ring channel;

a cylindrical sleeve mounted within said shaft and forming an inner axial channel and an outer axial channel, said inner axial channel being in communication with said lower shaft bores, and said outer axial channel being in communication with said upper shaft bores;

a disc spring arrangement mounted between an upper shoulder on an upper part of said shaft and the inner ring of said upper bearing, such that the preload on said upper bearing is in the direction of said socket; and shoulder means on a lower part of said shaft and abutting the inner ring of said lower bearing, whereby the bearing load is directed inclined toward the center of said shaft.

6. The combination of claim 5, wherein the interface between said socket and housing is sealed by a plurality of O-rings.

7. The combination of claim 6 wherein the interface between said socket and said shaft is sealed by a plurality of column seals.

* * * * *